Patented Oct. 10, 1950

2,524,865

UNITED STATES PATENT OFFICE 2,524,865

VAPOR PHASE CONVERSION OF 1-ALKYNOLS

Edwin V. Winslow, Jr., Philadelphia, Pa., assignor to Publicker Industries Inc., Philadelphia, Pa., a corporation of Pennsylvania No Drawing. Application November 14, 1947,
Serial No. 786,142

5 Claims. (Cl. 260—603)

The present invention relates to a novel method for the manufacture of valuable products by the catalytic conversion of 1-alkynols. More particularly, it pertains to the manufacture of valuable end products such as olefinic-acetylenic hydrocarbons, unsaturated ketones, and unsaturated aldehydes by means of the catalytic vapor phase conversion of 1-alkynols containing an active hydrogen atom in the one-position, and having the general formula:

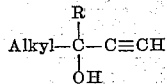

in which the substituent R represents either hydrogen, alkyl or an aryl group.

1-alkynols contemplated by the above general formula are 3-phenyl-1-butyne-3-ol, 3-methyl-1-pentyne-3-ol, 3-methyl-1-heptyne-3-ol, 3-methyl-1-butyne-3-ol, 1-butyne-3-ol, 3-ethyl-1-octyne-3-ol, 1-nonyne-3-ol, 1-hexyne-3-ol, 4-ethyl-1-octyne-3-ol, 3,5-dimethyl-1-hexyne-3-ol, 3-methyl-1-nonyne-3-ol, and the like.

It is an object of this invention to produce unsaturated ketones by means of a novel process involving the direct hydration of the corresponding unsaturated olefinic acetylenic hydrocarbon.

It is a further object of the present invention to provide a novel method for isomerizing 1-alkynols into their corresponding unsaturated aldehydes.

It is still further object of the present invention to provide a novel catalyst, by the use of which, the above and other valuable products can be produced in conversions of the order of 95 percent and above.

Other objects of the present invention will be apparent from the description which follows:

Attempts have previously been made to convert, by liquid phase methods, 1-alkynols of the type contemplated herein; however, the conversions and yields obtained in effecting such a process proved to be too unsatisfactory to justify any commercial exploitation or application thereof. Moreover, previous processes involving the utilization of vapor phase methods, while capable of producing the corresponding olefinic-acetylenic hydrocarbon in substantial quantities, yielded practically none of the corresponding valuable and highly reactive unsaturated ketone and/or aldehyde.

It has now been found that 1-alkynols of the above mentioned type can be efficiently converted into valuable products including the corresponding olefinic-acetylenic, unsaturated ketone and unsaturated aldehyde compounds by contacting said 1-alkynols in the vapor phase at elevated temperatures with a suitable catalyst. Thus, for example, 3-methyl-1-butyne-3-ol can, according to the present invention, be transformed in excellent conversions to 2-methyl-1-buten-3-one, 2-methyl-1-buten-3-yne, and 3-methyl-2-buten-1-al. The quantity of each end product formed is dependent to some extent upon the type of catalyst, the space velocity and the temperatures employed. Moreover, it has been found possible to increase the quantity of end products and to control the ratio of such products formed by controlling the concentration of water in the reaction mixture. Thus, it has been found that a preponderance of the olefinic-acetylenic compound is formed when substantially anhydrous reaction mixtures are utilized; whereas, with reaction mixtures containing up to as much as 50% water, there is a tendency to favor the formation of greatly increased quantities of the corresponding unsaturated ketone and aldehyde. In this connection, the formation of the unsaturated ketones in this process involves a heretofore unknown reaction, i. e., the direct hydration of the triple bond in olefinic-acetylenic compounds and the subsequent rearrangement of the resulting hydration product to the corresponding unsaturated ketone.

In accordance with the present invention, the 1-alkynol vapor which is preferably admixed with water, is introduced at elevated temperature in the reaction chamber of a catalytic vapor phase reactor of conventional design, and passed over a catalyst prepared by impregnating a suitable inert carrier with a phosphoric acid solution of a phosphate of a metal such as tin, cadmium, zinc, tungsten, nickel, copper, thorium, magnesium, and the like.

The temperature utilized in effecting the process may vary widely; however, in general it has been found that temperatures ranging from about 150° C. to about 250° C. are ordinarily satisfactory. The particular space velocity and catalyst employed also are of substantial importance in determining the optimum temperature for the conversion of a given 1-alkynol.

The space velocities employed may likewise vary considerably and, in general, it has been found that space velocities of from about 200 cc. to 4000 cc. (liquid feed) or higher, per hour per liter of catalyst give optimum conversions and yields of the desired end products.

The catalyst carrier utilized may be any of the well known inert carriers, however, I have found in general that in the majority of instances comparatively good yields of the desired unsaturated ketones and aldehydes can be obtained by employing a carrier consisting essentially of finely divided calcined diatomaceous earth. Other examples of carriers suitable for use in the process of the present invention are silica bonded aluminum oxide and silica gel.

In preparing the catalyst employed in the present invention, a phosphoric acid soluble compound of the desired metal such as the oxide, nitrate, or carbonate, is dissolved in phosphoric acid, i. e., ortho-phosphoric acid, to give a substantially clear solution, which I generally regard to be a solution of the corresponding metal monophosphate. The desired carrier or support is then impregnated with this solution after which, the impregnated carrier is allowed to dry and thereafter is ignited. In this connection, it has been observed that catalysts having optimum activities are obtained by generally employing ignition temperatures in the neighborhood of 500° C. to 600° C. Between runs the catalyst may be suitably regenerated with air at temperatures of from about 450° C. to 500° C. in order to remove the carbonaceous material deposited during the run. In regard to the above, it is to be strictly understood that the term "catalyst" as used throughout the present disclosure and claims is to be construed as a catalyst which has been prepared in accordance with the foregoing or equivalent conditions.

The present invention may be further illustrated by the following specific examples:

Example 1

To 300 cc. of hot water is added, with stirring, 20 grams of zinc oxide (pigment grade) after which the resulting mixture is heated to 80° C. and 88 cc. of 85% of phosphoric acid is gradually added to give clear solution. Thereafter, 132.3 grams of granular Celite V (a calcined diatomaceous earth, 6-8 mesh, manufactured by Johns-Manville) is added with occasional stirring, the solution still being maintained at a temperature of 80° C. After fifteen minutes, the mixture is transferred to a Buchner funnel and allowed to drain. The residue, thus obtained, is then placed in an evaporating dish, transferred to an oven at 110° C. and dried for a period of six hours. Thereafter, the dried residue is ignited at 600° C. for a period of four hours. After ignition it is found that a total of 36 grams of catalytic material is retained on the carrier. A mixture consisting of 75% 3-methyl-1-butyne-3-ol and 25% water is then mixed, vaporized, and passed over the catalyst prepared as described above at a temperature of from 190° C. to 215° C. at an average space velocity of 3830 cc. (liquid feed) per hour per liter of catalyst for a period of ten to twelve hours, after which the reaction chamber is flushed with an inert gas and the catalyst treated with a current of air at 400° C. for from two to four hours. The temperature is then reduced to between 190° C. and 200° C. and introduction of the 3-methyl-1-butyne-3-ol vapor resumed under the conditions above stated. The conversion of 3-methyl-1-butyne-3-ol amounts to 87.5% and 3-methyl-2-buten-1-al, 3-methyl-3-buten-1-yne, and 2-methyl-1-buten-3-one are obtained in yields of 36%, 44.2%, and 1.6%, respectively. 3-phenyl-1-butyne-3-ol, 3-methyl-1-octyne-3-ol, and 3-methyl-1-heptyne-3-ol, when treated in accordance with the conditions set forth above give the corresponding aldehydes, ketones and olefinic-acetylenic hydrocarbons in comparable yields and conversions.

The example which follows illustrates the capability of the catalysts of my invention to promote the reaction involving the direct hydration of the triple bond in an olefinic-acetylenic hydrocarbon.

Example 2

The catalyst is prepared by adding a mixture consisting of 2.2 grams of chromium oxide and 29 cc. of 85% phosphoric acid to a solution consisting of 5.5 grams of tungstic acid in 30 cc. of 28% ammonium hydroxide. To this mixture a total of 70 cc. of water is added with stirring. Thereafter, 44.1 grams of Celite V is impregnated with the aqueous mixture described above and after twenty minutes the resulting mixture is transferred to a Buchner funnel and allowed to drain. The residue thus obtained is then placed in an evaporating dish, transferred to an oven at 105° C. and dried for a period of five hours. Thereafter, the dried residue is heated at 250° C. for a period of four hours after which it is ignited at 500° C. for four hours. A mixture consisting of 60% 2-methyl-1-buten-3-yne and 40% water is then mixed, vaporized, and passed over the catalyst prepared as described above at a temperature of 250° C. and at an average space velocity of 1880 cc. (liquid feed) per hour per liter of catalyst for a period of ten hours, after which the reaction chamber is flushed with an inert gas and the catalyst treated with a current of air at 400° C. for from two to four hours. The temperature is then reduced to between 185° C. and 195° C. and introduction of the 2-methyl-1-butene-3-yne vapor resumed under the conditions specified above. The conversion of 2-methyl-1-buten-3-yne amounts to 30% corresponding to a yield of 86% of the 2-methyl-1-buten-3-one. An additional 14% of the converted material is obtained as a residue and the majority thereof consists of the dimer of 2-methyl-1-buten-3-one. Similiar olefinic-acetylenic hydrocarbons, such as 2-phenyl-1-buten-3-yne, 1-buten-3-yne, 3-methyl-3-hexen-1-yne, and 3-ethyl-3-penten-1-yne, when treated in accordance with the conditions set forth above, give the corresponding ketones in comparable yields and conversions.

The table listed below sets forth various additional catalysts and variations in space velocities, and temperatures which may be employed in converting 3-methyl-1-butyne-3-ol to the indicated end products. The feed mixtures employed varied in water content from 25% to 50%. The catalysts employed were prepared, generally, in accordance with the procedure set forth in Example 1.

Table

| Catalyst, Active Ingredients | Carrier | Temp., °C. | Space Velocity, cc./hr./l | Conversion, Per Cent | Yield, Wt. Per Cent | | |
|---|---|---|---|---|---|---|---|
| | | | | | 2-methyl-1-buten-3-yne | 2-methyl-1-buten-3-one | 3-methyl-2-buten-1-al |
| $NH_4H_2PO_4$ | Silica Gel | 250 | 660 | 79.2 | 54.1 | 6.1 | 14.2 |
| $CuH_2PO_4$ | Celite V | 250 | 460 | 93.5 | 38.2 | 34.2 | 9.0 |
| $CdHPO_4$ | do | 250 | 400 | 95.6 | 58.2 | 3.6 | 10.7 |
| $MgHPO_4$ | do | 250 | 230 | 95.1 | 59.2 | 2.1 | 19.2 |
| $NiHPO_4$ | do | 200 | 1,330 | 96.4 | 42.2 | 10.1 | 28.5 |
| $SnHPO_4$ | do | 200 | 1,630 | 97.5 | 36.8 | 5.4 | 29.2 |
| $Cr(H_2PO_4)_3$ $W(H_2PO_4)_6$ | do | 190-215 | 3,830 | 87.5 | 44.2 | 1.6 | 36.0 |
| $Th_3(PO_4)_4$ | do | 250 | 330 | 97.9 | 54.9 | 5.8 | 14.3 |
| $W(H_2PO_4)_2$ | do | 200 | 1,670 | 89.3 | 38.7 | 3.0 | 31.0 |
| $ZnHPO_4$ | R. A.-9 [1] | 300 | 130 | 53.8 | 43.1 | 5.8 | 19.8 |

[1] A finely divided calcined silica bonded alpha aluminum oxide.

It is to be strictly understood that the foregoing example and data appearing in the above table are merely illustrative of the present invention and are to be in no way construed as limitative thereof. As will be apparent to those skilled in the art, the process of the present invention is susceptible of numerous modifications without departing from the scope thereof. Thus, for example, while the preparation of the catalyst employed as set forth above involves impregnation of the desired metal phosphate by means of contacting the catalyst carrier with a phosphoric acid solution of the phosphoric acid soluble metal and igniting the carrier so impregnated, it is to be understood that I do not desire to limit myself to catalysts so prepared. For example, equivalent catalysts may be prepared by mixing the carrier with the metal phosphate in a micro pulverizer, etc. In general, it may be said that any modifications of the present invention which would normally occur to one skilled in the art are to be construed as lying within the scope thereof.

What I claim is:

1. A process for converting 1-alkynols having an active hydrogen atom in the one-position and having the general formula:

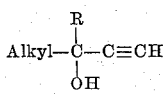

in which R is a member of the group consisting of hydrogen, aryl and alkyl, to a mixture of

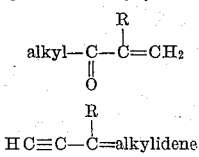

and

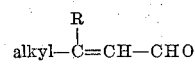

which comprises passing a vapor-phase reaction mixture consisting essentially of from about 50% to 75% of a 1-alkynol of the aforesaid type and from 25% to 50% water over a catalyst comprising an inert carrier selected from the group consisting of finely divided diatomaceous earth, silica bonded aluminum oxide and silica gel, said carrier having been impregnated with a phosphoric acid solution containing a phosphoric acid soluble metal phosphate selected from the group consisting of monocadmium phosphate, monocopper phosphate, monotin phosphate, monomagnesium phosphate, mononickel phosphate, monozinc phosphate, monochromium phosphate, monothorium phosphate, monothorium phosphate and monotungsten phosphate, at a temperature of between about 150° C. and about 250° C.

2. A process for converting 1-alkynols having an active hydrogen atom in the one-position and having the general formula:

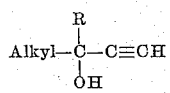

in which R is a member of the group consisting of hydrogen, aryl and alkyl, to a mixture of

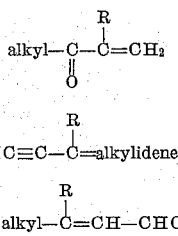

which comprises passing a vapor-phase reaction mixture consisting essentially of from about 50% to 75% of a 1-alkynol of the aforesaid type and from 25% to 50% water over a catalyst comprising an inert carrier selected from the group consisting of finely divided diatomaceous earth, silica bonded aluminum oxide and silica gel, said carrier having been impregnated with a phosphoric acid solution containing a phosphoric acid soluble metal phosphate selected from the group consisting of monocadmium phosphate, monocopper phosphate, monotin phosphate, monomagnesium phosphate, mononickel phosphate, monozinc phosphate, monochromium phosphate, monothorium phosphate and monotungsten phosphate.

3. In a process for the conversion of 3-methyl-1-butyn-3-ol to a mixture of 2-methyl-1-buten-3-one, 2-methyl-1-buten-3-yne and 3-methyl-2-buten-1-al, the step which comprises passing a vapor-phase reaction mixture consisting essentially of from about 50% to 75% of 3-methyl-1-butyn-3-ol and from about 25% to 50% water, over a catalyst comprising essentially finely divided calcined diatomaceous earth which has been impregnated with a phosphoric acid solution containing a phosphoric acid soluble zinc compound, said conversion being effected at a temperature of from between about 150° C. to about 250° C. and at an average space velocity of between about 200 cc. to 4000 cc. per hour per liter of catalyst.

4. In a process for the conversion of 3-methyl-1-butyn-3-ol to a mixture of 2-methyl-1-buten-3-one, 2-methyl-1-buten-3-yne and 3-methyl-2-buten-1-al, the step which comprises passing a vapor-phase reaction mixture consisting essentially of from about 50% to 75% of 3-methyl-1-butyn-3-ol and from about 25% to 50% water, over a catalyst comprising essentially finely divided calcined diatomaceous earth which has been impregnated with a phosphoric acid solution containing a phosphoric acid soluble tungsten-chromium compound, said conversion being effected at a temperature of from between about 150° C. to about 250° C. and at an average space velocity of between about 200 cc. to 4000 cc. per hour per liter of catalyst.

5. In a process for the conversion of 3-methyl-1-butyn-3-ol to a mixture of 2-methyl-1-buten-3-one, 2-methyl-1-buten-3-yne and 3-methyl-2-buten-1-al, the step which comprises passing a vapor-phase reaction mixture consisting essentially of from about 50% to 75% of 3-methyl-1-butyn-3-ol and from about 25% to 50% water, over a catalyst comprising essentially finely divided calcined diatomaceous earth which has been impregnated with a phosphoric acid solution containing a phosphoric acid soluble nickel compound, said conversion being effected at a temperature of from between about 150° C. to about 250° C. and at an average space velocity of between about 200 cc. to 4000 cc. per hour per liter of catalyst.

EDWIN V. WINSLOW, Jr.

REFERENCES CITED

The following references are of record in the file of this patent:

UNITED STATES PATENTS

| Number | Name | Date |
|---|---|---|
| 1,255,590 | Ellis | Feb. 5, 1918 |
| 1,841,055 | Reppe et al. | Jan. 12, 1932 |
| 1,950,441 | Carothers | Mar. 13, 1934 |
| 2,197,956 | Vaughn | Apr. 23, 1940 |
| 2,204,157 | Semon | June 11, 1940 |
| 2,250,558 | Vaughn | July 29, 1941 |
| 2,386,325 | Lorch | Oct. 9, 1945 |
| 2,399,164 | Bludworth | Apr. 30, 1946 |
| 2,422,991 | Strang | June 24, 1947 |